United States Patent [19]

Kawanabe

[11] 4,064,559
[45] Dec. 20, 1977

[54] APPARATUS FOR SUPPRESSING UNDESIRED INFORMATION

[75] Inventor: Tsuyoshi Kawanabe, Yokohama, Japan

[73] Assignee: Canon Kabushiki Kaisha, Tokyo, Japan

[21] Appl. No.: 560,509

[22] Filed: Mar. 20, 1975

Related U.S. Application Data

[63] Continuation of Ser. No. 358,486, May 9, 1973, abandoned.

[30] Foreign Application Priority Data

May 15, 1972 Japan .................................. 47-47862

[51] Int. Cl.² .............................................. G06F 3/14
[52] U.S. Cl. .................................................. 364/900
[58] Field of Search ....... 340/172.5, 324 R, 146.1 AB, 340/146.3, 146.3 R; 235/92 PL; 364/200, 900

[56] References Cited

U.S. PATENT DOCUMENTS

| 3,388,384 | 6/1968 | Bogert et al. ............... 340/172.5 |
| 3,537,073 | 10/1970 | Sakoda et al. ............... 340/172.5 |
| 3,560,954 | 2/1971 | Yanagaisawa et al. ....... 340/172.5 X |
| 3,618,032 | 11/1971 | Goldsberry et al. ......... 340/172.5 |
| 3,662,346 | 5/1972 | Tada .............................. 340/172.5 |
| 3,815,098 | 6/1974 | Kimura et al. ................ 340/172.5 |

Primary Examiner—Mark E. Nusbaum
Attorney, Agent, or Firm—Fitzpatrick, Cella, Harper & Scinto

[57] ABSTRACT

An apparatus for suppressing undesired information comprises an information storge device in which characters or symbols of plural digits are stored in the form of coded information. Digit designating means is provided to designate digits for detecting whether output of the information stored in the storage device is desired or not. Also, means are provided for reducing the designated digits of the storage device by one digit when the detecting means detects that the information to be displayed is present in at least one of the designated digits of the storage device, and for suppressing the information in the at least one digit of the storage device designated by the designating means when the information to be displayed is not present in any of the designated digits of the storage device.

3 Claims, 5 Drawing Figures

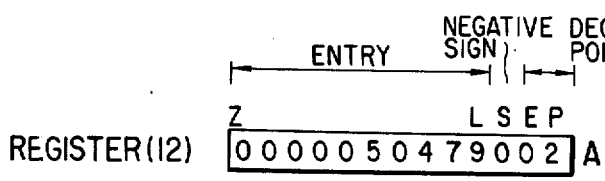

FIG. 3

| | | REGISTER(11) | | Z REGISTER(18) L S E P | |
|---|---|---|---|---|---|
| REGISTER(12) | | 0 0 0 0 0 5 0 4 7 9 0 0 2 | A | | |
| R12 → R11 (PZ) | | 0 0 0 0 0 5 0 4 7 9 0 0 2 | B | | B' |
| SET R18 (LZ) | | 0 0 0 0 0 5 0 4 7 9 0 0 2 | C | 1 1 1 1 1 1 1 1 1 1 0 0 0 | C' |
| R18(PE)≠0 YES | | 0 0 0 0 0 5 0 4 7 9 0 0 2 | D | 1 1 1 1 1 1 1 1 1 1 0 0 0 | D' |
| R11−1→R11 (PZ) LEFT SHIFT R18(LZ) | | 0 0 0 0 0 5 0 4 7 9 0 0 1 | E | 1 1 1 1 1 1 1 1 1 0 0 0 0 | E' |
| R18(PE)≠0 YES | | 0 0 0 0 0 5 0 4 7 9 0 0 1 | F | 1 1 1 1 1 1 1 1 1 0 0 0 0 | F' |
| R11−1→R11 (PE) LEFT SHIFT R18(LZ) | | 0 0 0 0 0 5 0 4 7 9 0 0 0 | G | 1 1 1 1 1 1 1 1 0 0 0 0 0 | G' |
| R11(PE)≠0 NO | | 0 0 0 0 0 5 0 4 7 9 0 0 0 | H | 1 1 1 1 1 1 1 1 0 0 0 0 0 | H' |
| CHARACTER GENERATION(A)→R11(R18) | | A A A A A A A A 7 9 0 0 0 | I | 1 1 1 1 1 1 1 1 0 0 0 0 0 | I' |
| RIGHT SHIFT R11(SZ) | | 0 A A A A A A A A 7 9 0 0 | J | 1 1 1 1 1 1 1 1 0 0 0 0 0 | J' |
| R12 → R11 (R18) | | 0 0 0 0 0 5 0 4 A 7 9 0 0 | K | 1 1 1 1 1 1 1 1 0 0 0 0 0 | K' |
| LEFT SHIFT R11(SZ) | | 0 0 0 0 5 0 4 A 7 9 0 0 0 | L | 1 1 1 1 1 1 1 1 0 0 0 0 0 | L' |
| LEFT SHIFT R18(LZ) | | 0 0 0 0 5 0 4 A 7 9 0 0 0 | M | 1 1 1 1 1 1 1 0 0 0 0 0 0 | M' |
| LEFT SHIFT R18(LZ) | | 0 0 0 0 5 0 4 A 7 9 0 0 0 | N | 1 1 1 1 1 1 0 0 0 0 0 0 0 | N' |
| R11(R18)≠0? YES | | 0 0 0 0 5 0 4 A 7 9 0 0 0 | O | 1 1 1 1 1 1 0 0 0 0 0 0 0 | O' |
| LEFT SHIFT R18(LZ) | | 0 0 0 0 5 0 4 A 7 9 0 0 0 | P | 1 1 1 1 1 0 0 0 0 0 0 0 0 | P' |
| R11(R18)≠0? YES | | 0 0 0 0 5 0 4 A 7 9 0 0 0 | Q | 1 1 1 1 0 0 0 0 0 0 0 0 0 | Q' |
| LEFT SHIFT R18(LZ) | | 0 0 0 0 5 0 4 A 7 9 0 0 0 | R | 1 1 1 1 0 0 0 0 0 0 0 0 0 | R' |
| R11(R18)≠0? NO | | 0 0 0 0 5 0 4 A 7 9 0 0 0 | S | 1 1 1 1 0 0 0 0 0 0 0 0 0 | S' |
| CHARACTER GENERATION(F)→R11(R18) | | F F F F 5 0 4   7 9 0 0 0 | T | 1 1 1 1 0 0 0 0 0 0 0 0 0 | T' |

APPARATUS FOR SUPPRESSING UNDESIRED INFORMATION

This is a continuation of application Ser. No. 358,486 filed May 9, 1973, entitled "Apparatus for Suppressing Undesired Information," now abandoned.

BACKGROUND OF THE INVENTION

1. Field of the Invention

This invention relates to an apparatus for suppressing undesired information in data processors.

2. Description of the Prior Art

In data processors, information entered and processed may be stored in a data storage device and during such data storage, the portion of the device to which no information has been applied is recorded as "0" which would be identified with significant "0". The result is that when the output from such data storage device is applied to a printer, an optical display device or the like, not only the desired data but also undesired information such as zeroes in the more significant digits have been displayed, thus imposing upon a viewer the trouble of discriminating effective data from the displayed data.

SUMMARY OF THE INVENTION

It is therefore an object of the present invention to present an apparatus for suppressing undesired information so that such insignificant information may not be displayed.

It is another object of the present invention to present an apparatus for suppressing undesired information in which any digit carrying undesired information may be detected and the information of such detected digit may be determined so as not to be displayed.

It is still another object of the present invention to present an apparatus for suppressing undesired information in which digit designating means for designating the digits for detecting any undesired information among the data to be applied from an information storage device is provided so that the digits designated by the digit designating means may be reduced whenever the designated digits carry any information to be displayed, whereby when the information to be displayed becomes absent in the designated digits the output may be suppressed only in such particular digits designated by the digit designating means.

It is yet another object of the present invention to present an apparatus for suppressing undesired information in which whenever no information to be displayed is present in the digits of the information storage device designated by the digit designating means, a coded signal indicative of undesired information may be inserted in the designated digits of the information storage device.

Other objects and features of the present invention will become more fully apparent from the following detailed description taken in conjunction with the accompanying drawings.

BRIEF DESCRIPTION OF THE DRAWINGS

FIG. 3 illustrates the shift of information in registers 11, 18 shown in block in FIG. 2.

DESCRIPTION OF THE PREFERRED EMBODIMENTS

Figure 1:
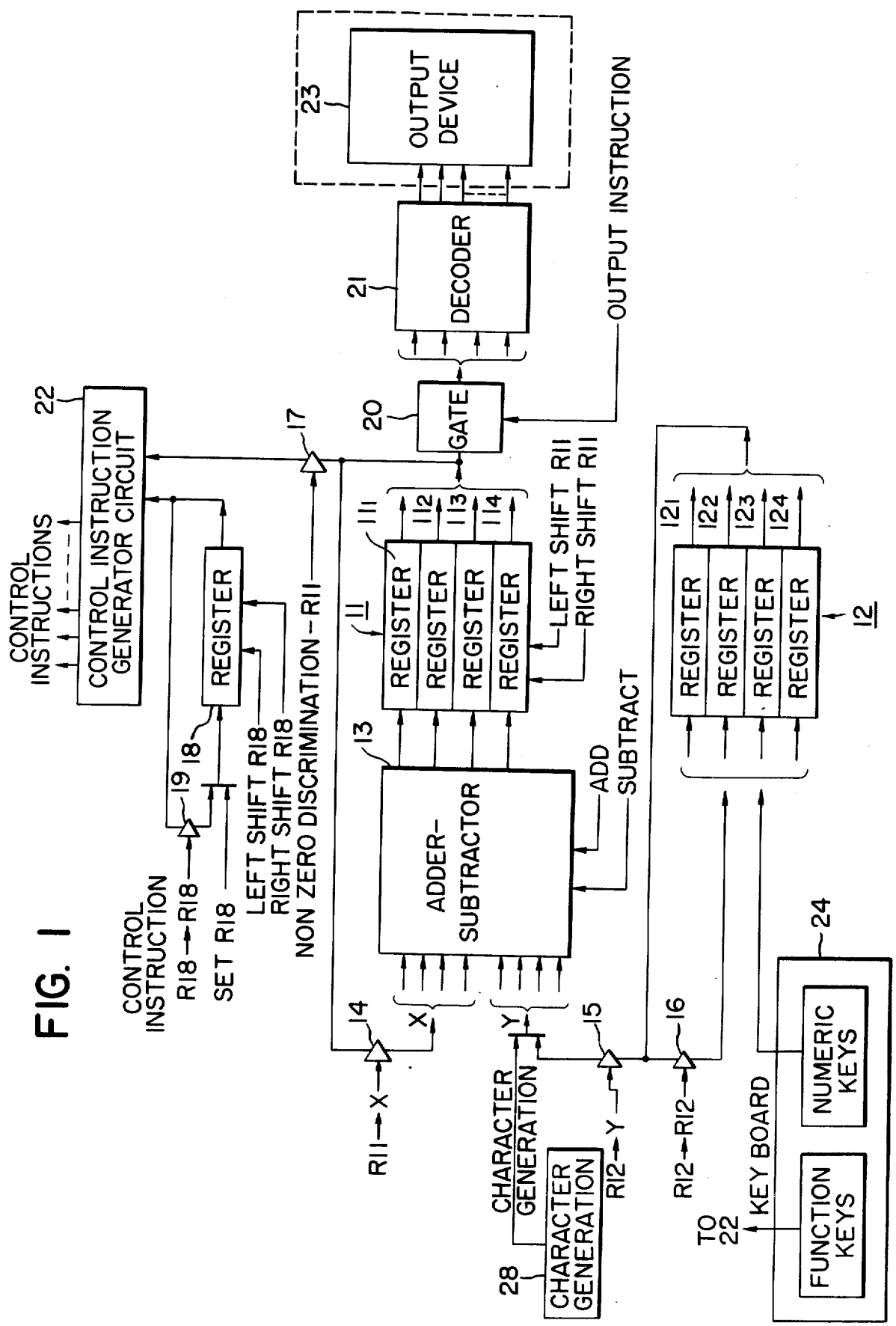
FIG. 1 is a block diagram of an electronic desk top calculator to which the present invention has been applied.

Referring to FIG. 1, the apparatus for suppressing undesired information according to an embodiment of the present invention is generally shown in block diagram. Shift registers 11 and 12 may store therein characters or symbols of plural digits in the form of coded information and comprise registers $11^1$, $11^2$, $11^3$, $11^4$ and $12^1$, $12^2$, $12^3$, $12^4$, respectively. Thus, each of the registers 11 and 12 constitutes a register of 4-bit parallel configuration.

In this embodiment, each register 11, 12 consists of thirteen digits in all, of which the least significant two digits provide decimal point digits, the third least significant digit represents the negative sign, and the remaining ten digits from the fourth least significant digit to the most significant digit represent numerical values. However, since the most significant digit is not concerned with actual display or printing, 9-digit numerals are the biggest ones which may be maintained during actual display.

Further, the present embodiment is for use in those cases where the undesired information constitutes zeroes occupying the more significant digits in a numeral to be displayed or printed. On the input side of the register 11 there is disposed a total adder-subtractor 13 for adding or subtracting the inputs to the two inputs X and Y thereof. Any suitable adder-subtractor may be employed such as illustrated in FIGS. 9, 18, on Page 224 of "Designing with TTL Integrated Circuits" edited by Robert L. Morris and John R. Miller, published by McGraw-Hill Book Company in 1971. A control instruction "R11→X," meaning that the content of the register 11 should be applied to the input X, is normally applied as an input to the gate 14 of the input X side, and the output of the register 11 is applied to the input X through the gate 14, so that the content of the register 11 is recirculated and held. Also, when an instruction "Add" or "Subtract" has been applied, the output of the register 12 is delivered as an input to the gate 15 of the input Y side in accordance with an instruction "R12→Y," meaning that the content of the register 12 should be applied to the input Y, so that addition or subtraction is carried out between such input and the input to the X side of the total adder 13, whereafter the result of such calculation is held in the register 11.

In addition to the instruction "Add" or "Subtract," an instruction "Character Generation" may be applied to the input Y side, in which case a code designated by such instruction is applied as an input to the Y side from a character generator 28. At this time, any input to the X side is inhibited and no addition or subtraction takes place while the designated code itself is held in the register 11. Any suitable character generator may be employed such as illustrated and described in U.S. Pat.

No. 3,537,073, referred to as a "Redundancy Code Generator," element 15.

A gate 16 opens in response to an instruction "R12→R12," meaning that the output of the register 12 should be brought back to the input of the register 12, so as to cause the content of the register 12 to be recirculated and held.

A gate 17 provided on a signal line leading from a portion of the recirculation loop of the register 11 to a control instruction forming circuit 22 effects non-zero determination in accordance with an instruction "Non-zero Determination R11," meaning that whether the content of the register 11 is zero or not should be determined, and then applies the result to the circuit 22. Any suitable control instruction generator circuit may be employed such as the one employed in the integrated circuit commercially available in 1969 as "TMSO 100 series" by T. I. Co. Ltd.

Also, as will be appreciated by those skilled in the art, the required control instruction generator circuit may comprise a control chip manufactured by Hitachi Ltd., Japan, designated as LSI (HD32107P); a read only memory (ROM) manufactured by Hitachi Ltd., Japan, designated as LSI (HD32110P); a data chip manufactured by Hitachi Ltd., Japan, designated as LSI (HD32108P); and a printer chip manufactured by Hitachi Ltd., Japan, designated as LSI (HD32109P). The ROM stores instructions R, G and H, each comprising four bits, respectively, as shown in the following table:

| INSTRUCTION R | R8 | R4 | R2 | R1 | ABBREV-IATION | NAME | NOTE |
|---|---|---|---|---|---|---|---|
| | | | | | | R-Part R3,R4,R2,R1 | G-Part G8,G4,G2,G1 | H-Part H8,H4,H2,H1 |
| R(0) | 0 | 0 | 0 | 0 | C1 | CONTROL - 1 | |
| R(1) | 0 | 0 | 0 | 1 | C2 | CONTROL - 2 | |
| R(2) | 0 | 0 | 1 | 0 | SF | SENSE FLAG CHARACTER | |
| R(3) | 0 | 0 | 1 | 1 | CG | GENERATE | G8,G4,G2,G1→AR |
| R(4) | 0 | 1 | 0 | 0 | LD | LOAD | AR←BR,CR,MR |
| R(5) | 0 | 1 | 0 | 1 | STR | STORE | AR→BR,CR,MR |
| R(6) | 0 | 1 | 1 | 0 | SWP | SWAP | AR⇌BR,CR,MR |
| R(7) | 0 | 1 | 1 | 1 | SRG | SENSE REGISTER | Sense Non-Zero AR,BR,CR,MR |
| R(8) | 1 | 0 | 0 | 0 | ADD | ADD | AR+1,DL,RNDL, BR,CR,MR |
| R(9) | 1 | 0 | 0 | 1 | SUB | SUBTRACT | AR−1,DL,RNDL, BR,CR,MR |
| R(A) | 1 | 0 | 1 | 0 | BL | BRANCH & LINK | Address 9 BIT (R1,G,H) |
| R(B) | 1 | 0 | 1 | 1 | BL | BRANCH & LINK | " |
| R(C) | 1 | 1 | 0 | 0 | BU | BRANCH UNCONDITIONALLY | " |
| R(D) | 1 | 1 | 0 | 1 | BU | BRANCH UNCONDITIONALLY | " |
| R(E) | 1 | 1 | 1 | 0 | BC | BRANCH ON CONDITION | " |
| R(F) | 1 | 1 | 1 | 1 | BC | BRANCH ON CONDITION | " |

| G | R(0);C1 | R(1);C2 | R(2);SF | R(4)~R(9) |
|---|---|---|---|---|
| G(0) | HALT (Read | — | Sense SNZ Non-Zero | OR |
| G(1) | RDK Key) | — | SNZ TMR | ONE |
| G(2) | RTN(Return) | Left Shift AR | SNZ FA | RNDL |
| G(3) | PAGE | Right Shift AR | SNZ FB | AR |
| G(4) | Set Up TMR | JAM | SNZ FSW | BR |
| G(5) | Reset TMR | AR WR | SNZ FLG | CR |
| G(6) | Left-Shift TMR | Start Print 1 | SNZ FOF | MIR |
| G(7) | Right Shift TMR | Start Print 2 | SNZ KST | (M2R) |
| G(8) | — | 1 FZ | (Sense SZ zero) | (M3R) |
| G(9) | 0→FA | 0FZ | SZ TMR | (M4R) |
| G(A) | 0→FB | SNZ FZ | SZ FA | (M5R) |
| G(B) | 0→FOF | SZ FZ | SZ FB | (M6R) |
| G(C) | 1→TMR | B−1→A,A→B | SZ FSW | (M7R) |
| G(D) | 1→FA | B+1→A,A→B | SZ FLG | (M8R) |
| G(E) | 1→FB | Mult Routine | SZ FOF | (M9R) |
| G(F) | 1→FOF | Div.Routine | SZ KST | (M10R) |

| H | ABBREVIATION | EXECUTIVE TIMING(OP) NOTE |
|---|---|---|
| H(0) | T(t) | Special Timer(TMR) |
| H(1) | P(p) | Decimal Point First Digit |
| H(2) | E(e) | Decimal Point Second Digit |
| H(3) | PE(pe) | |
| H(4) | T26 | T26 |
| H(5) | T27 | T27 |
| H(6) | T32 | T32 |
| H(7) | T33 | T33 |
| H(8) | S(s) | |
| H(9) | X(x) | |
| H(A) | L(l) | LSD |
| H(B) | PZ(pz) | P~Z |
| H(C) | SX(sx) | S~X |

| | | |
|---|---|---|
| H(D) | M(m) | MSD |
| H(E) | LX(lx) | L~X |
| H(F) | SM(sm) | S~M |

The above-mentioned commercially available control chip includes a sequence counter control which addresses the ROM so that an instruction (12 bits) stored in the ROM can be read out. The read out instructions are stored in instruction registers in the control chip and data chip. The instruction register in the data chip stores only R and G instructions, and the contents of this register are decoded by a decoder in the data chip to control the registers 11 and 12, FIG. 1. Likewise the instructions R and G in the instruction register in the control chip are decoded by a decoder in the control chip to produce control orders and, in addition, the instruction H in the instruction register in the control chip is decoded by the decoder to control the register 18 to produce the timing orders. The foregoing decoders comprise diode matrixes from which control order signals are delivered.

Furthermore, circuitry equivalent to the above-mentioned LSI and ROM devices is described in a published Manual dated February, 1973, by Intel corporation entitled "MCS-4 Microcomputer Set User's Manual."

A register 18 acts as an information storage device for designating digits to be determined as to whether or not any of the information stored in the register 11 should be displayed or printed, and it has a 13-bit time which is equal in length to the register 11 or 12. A gate 19 to the register 18 is opened by an instruction "R18→R18," meaning that the output of the register 18 should be brought back to the input of the register 18, so as to cause the content of the register 18 to be recirculated and held, but when an instruction "Set R18," meaning that the register R18 should be set is applied, only the bits in the digits corresponding to the time designated by such instruction are newly set independently of the previous content.

The contents of the bits corresponding to the designated time shift leftwardly or rightwardly by one bit (one digit) in accordance with an instruction "Left Shift R18" or "Right Shift R18," just as does the register 11 in accordance with an instruction "Left Shift R11" or "Right Shift R11."

The register 18 may be utilized as a counter by using a combination of several instructions or may provide an output for displaying the decimal point or other type of information. In addition, the 13-bit content of this register may be used directly to determine a designated time for executing various other types of instructions.

For example, if only the desired bits of the register 18 are set to "1" in accordance with the instruction "Set R18" or "Left Shift R18," and then control is exercised to designate the register 18 for determining the designated execution time, then the instruction "R12→Y" may be executed only for the digits corresponding to the bits thus set to "1."

According to the present embodiment, the register 18 is used to determine the period of time (digit) for detecting whether the information held by the register 11 is non-zero or not, and more specifically, the non-zero detection is executed with regard to the digits of the register 11 which correspond to the digits of the register 18 which have been set to "1."

Figure 5:
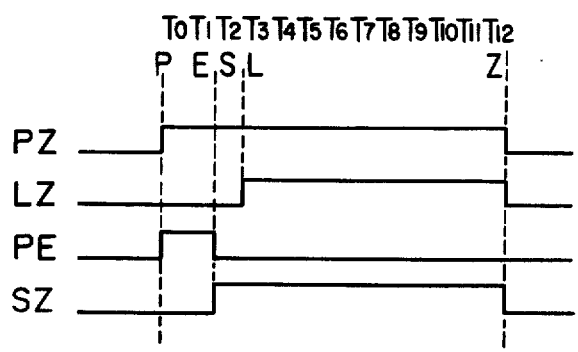
FIG. 5 illustrates time signals applied to the registers 11, 12.

In the present embodiment, the time for designating the execution of various instructions may be selected by selecting the said bits of the register 18, and in addition, the periods of time as shown in FIG. 5 may also be selected thus:

PZ : Time for all digits from the least significant digit (the decimal point digit "P") to the most significant digit ("Z")

LZ : Time from the least significant one of the numeric digits (the fourth least significant digit "L") to the digit ("Z")

PE : Time for the two decimal point digits ("P" and "E")

SZ : Time from the negative sign digit (the third least significant digit "S") to the digit ("Z")

Figure 2:
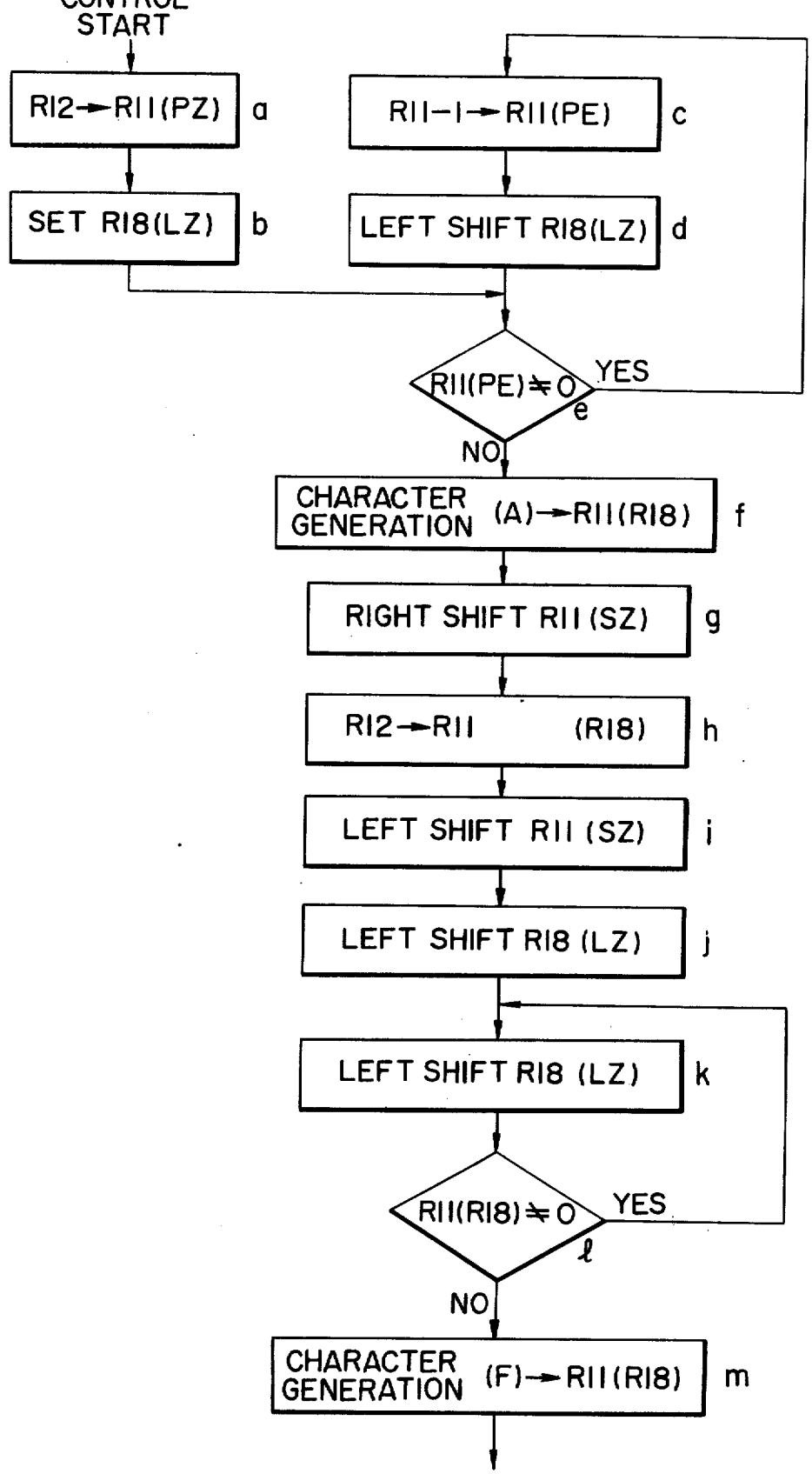
FIG. 2 is a flow chart for illustrating the sequence of operations involved in suppressing undesired information in the calculator of FIG. 1.

Any suitable shift registers may be employed for shift registers 11, 12 and 18 such as illustrated in FIGS. 11,2 on Page 286 of "Designing with TTL Integrated Circuits" edited by Robert L. Morris and John R. Miller, published by McGraw-Hill Book Company in 1971.

Reference numeral 20 denotes a gate circuit which opens the gate in response to an output instruction applied thereto so as to supply the content of the register 11 to a decoder 21. The decoder 21 decodes the content of the register 11 and applies the decoded output to an output device 23, which in turn displays the content of the register 11. The output device may be a printer or an optical display device such as a cold cathode emission tube. Any suitable display device may be employed such as the display device illustrated and described in U.S. Pat. No. 3,537,073.

A keyboard 24 is provided for producing input signals and comprises two different groups of keys. One group of keys 25 consist of numeric keys for entering numeric information and the other group of keys 26 consist of function keys for instructing data process. Signals from the keys 25 are applied to the register 12 and signals from the keys 26 are applied to the control instruction forming circuit 22.

Figure 4:
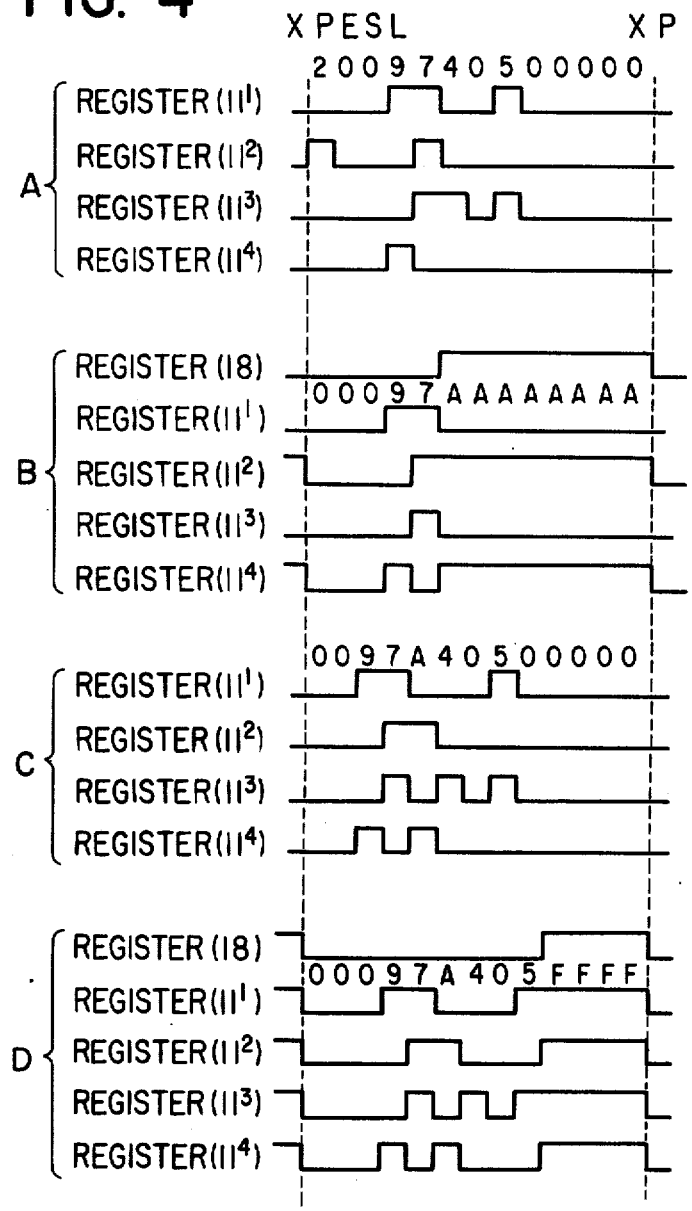
FIG. 4 illustrates the waveforms of the signals in the registers 11, 18.

The actual operation of the apparatus for suppressing undesired information as shown in FIG. 1 will now be described in connection with the flow chart of FIG. 2, the shift of the information in the registers 11 and 18 as shown in FIG. 3, and the signal waveforms as shown in FIG. 4.

In FIG. 2, it is assumed that, prior to the control start, some numeric data (including the decimal point) for suppressing undesired "0" is held in the register 12 as by being applied through the keys 25. A specific example of the numeral to be displayed may comprise, as shown in FIG. 3A, an integer portion "0000050479" and a decimal point digit "2," namely, a number "504.79." In this instance, the output waveforms of the respective bit registers $12^1$, $12^2$, $12^3$ and $12^4$ in the register 12 will be such as shown in FIG. 4A.

Now, the sequence of operation will be described with respect to the flow of control as shown in FIG. 2. Upon application of an output instruction, an instruction "R12→R11(PZ)" is sent as shown in FIG. 2(a), so that all digits of the data held in the register 12 are transferred to the register 11 during the time PZ. Since the transfer of the information from the register 12 to the register 11 takes place without any change in the arrangement of the data, the content of the register 11 as shown in FIG. 3B is identical with that of the register 12 shown in FIG. 3A. Subsequently, in accordance with an instruction "Set R18(LZ)" applied as shown in FIG. 2(b), only those bits for the timing "LZ" corresponding to the digits other than the decimal point digit and the negative sign digit are set in the timing register 18. Thus, as seen in FIG. 3C', the bits of the ten more significant digits in the register 18 are set.

Thereafter, a decimal point code is inserted in a predetermined digit according to the steps as shown in FIGS. 2(c)–(i) which will be described hereunder.

First, as seen in FIG. 2(e), whether the decimal point digit (time PE) in the register 11 is zero or not is determined by the gate 17. In the illustrated embodiment, the number for the decimal point digit is initially "2" instead of "0", as shown in FIG. 3D, and therefore the result of the determination is "YES" and the operation jumps to the step of FIG. 2(c). Here the adder-subtractor 13 subtracts "1" from the number (time PE) representing the decimal point position in the register 11, with a result that the "PE" digit in the register 11 assumes "1" as shown in FIG. 3E. Then, in accordance with an instruction "Left Shift R18(LZ)" as shown in FIG. 2(d), the content of the digits in the register 18 corresponding to the time LZ is shifted leftwardly by one bit (one digit), with a result that only the nine more significant digits for the time "LZ" assume "1", as shown in FIG. 3E'. In this way, the steps of FIGS. 2(c), (d) and (e) are repeated until the content of the decimal point digit (time PE) in the register 11 becomes zero.

In the illustrated embodiment, the number for the "PE" in the register 11 has initially been "2," and this means that the steps of FIGS. 2(c), (d) and (e) are repeated for two cycles to make the "PE" of the register 11 into "0" as shown in FIG. 3G. The content of the register 18 is now such as shown in FIG. 3G', where the eight more significant digits (8 bits) assume "1." When the decimal point content (time PE) in the register 11 has thus become zero, the result of the determination in FIG. 2(e) is "NO" and the next step (f) is entered.

FIGS. 2(f)–(i) show the steps for forming a decimal point code in the digit of the register 11 corresponding to the decimal point digit. First, in the step of FIG. 2(f), a decimal point code (herein, hexadecimal code "A" (1010)) is formed in each of those digits of the register 11 corresponding to the bits having "1" formed in the register 18 by the described steps of FIGS. 2(c)–(e), in accordance with an instruction "Character Generation." As a result, the content of the register 11 becomes such as shown in FIG. 3I, with the registers 11¹, 11², 11³ and 11⁴ providing waveforms as shown in FIG. 4(B).

Then, the operation advances to the step of FIG. 2(g), wherein the numerical portion of the content of the register 11 is shifted rightwardly by one digit in accordance with an instruction "Right Shift R11(SZ)." Thus, the least significant digit of the numerical portion in the register 11 is inserted in the digit "S" or the negative sign digit, as seen in FIG. 3J.

Subsequently, the operation advances to the step of FIG. 2(h), wherein the content of the eight more significant digits which correspond to the bits of information in the register 18 is transferred from the register 12 to the register 11 in accordance with an instruction "R12-R11(R18)." The result is such as shown in FIG. 3K, where the content of the register 11 is identical with that of the register 12 in those digits leftward of the decimal point code "A," and thus, an integer portion, a decimal point code and a decimal portion are formed in the register 11 with the registers 11¹, 11², 11³ and 11⁴ providing such waveforms as shown in FIG. 4(C).

Next, the operation progresses to the step of FIG. 2(i), wherein all the numerical portion of the register 11 is leftwardly shifted by one digit in accordance with an instruction "Left Shift R11(SZ)" while the content of the least significant digit of the numerical portion which has been in the "S" digit is brought back to the "L" digit. Thus, as shown in FIG. 3L, the decimal point code is inserted in a predetermined numeric digit in the register 11 but the register 18 remains unchanged during the steps (f) to (i) in FIG. 2.

The operation now advances to the step of FIG. 2(j), wherein the register 18 is leftwardly shifted by one digit in accordance with an instruction "Left Shift R18(LZ)." Thus, the content of the register 18 becomes such as shown in FIG. 3M'.

Subsequently, the steps of FIGS. 2(k), (l) and (m) take place to form a code for suppressing the undesired "O" occupying the several more significant digits.

More specifically, during the step of FIG. 2(k), the register 18 is further shifted leftwardly by one digit to cause only the six more significant digits to assume a "1" as shown in FIG. 3N', these six digits providing a time for the non-zero determination.

Thereafter, the operation progresses to the step of FIG. 2(l), wherein in accordance with an instruction "Non-zero Determination R11(R18)," the gate 17 determines whether the content of the register 11 is zero or not with respect to the digits corresponding to the content of the register 18 set by "1," i.e. the time for the non-zero determination of the said six more significant digits. Here, these six digits of the register 11 assume non-zero value as seen in FIG. 3(O), and therefore the result of the determination is "YES" and the operation jumps back to the step of FIG. 2(k).

In this way, the steps of FIGS. 2(k) and (l) are repeated until the answer "NO" appears in the step of FIG. 2(l), whereupon the operation advances to the step (m).

In the present embodiment, the steps of FIGS. 2(k) and (l) are repeated as seen in FIGS. 3, P', Q' and R', and when the content of the register 18 has come to consist of the four more significant digits alone, all the digits of the register 11 corresponding thereto assume "O," whereby "NO" is given as the result of the determination in the step of FIG. 2(l) to allow the operation to advance to the next step (m).

During the step (m), a code for suppressing undesired "O" information (herein, hexadecimal code "F" (1111)) is formed in the digits (the four more significant digits) of the register 11 corresponding to the content of the register 18, in accordance with an instruction "Character Generation R11(R18)."

Thus, the content of the register 11 becomes such as shown in FIG. 3T, with the registers 11¹, 11², 11³ and 11⁴ providing such waveforms as shown in FIG. 4(D).

In this way, undesired 0's that need not be printed or displayed are converted into "F" code in accordance with the content of the register 18 and accommodated in the register 11. Therefore, these undesired 0's may be suppressed during the display or printing by preventing the "F" code from being displayed or printed. In the embodiment of FIG. 1, the content of the register 11 is applied to the decoder 21 which decodes the code 0000 – 1001 into numbers 0 – 9 and "A" code (1010) into decimal point, whereby the output of "F" code (1111) is suppressed and used to drive the output device 23, thus suppressing the undesired 0's occupying the more significant digits.

While the present embodiment has been described to convert the undesired 0's in the register 11 into "F" code in accordance with the content of the register 18, suppression of undesired 0's could equally be achieved without converting the information in the register 11 but by suppressing such information during the display or printing in accordance with the content of the register 18 (i.e. by controlling the digits of the register 18 carrying "1" so as not to be displayed).

In the illustrated embodiment, the register 11 has been shown and described as having an exclusive digit for the decimal point code, whereas this has nothing to do with the essential of the present invention and the invention can effectively achieve its object also in the system having no such exclusive digit for the decimal point code.

Figure 6:
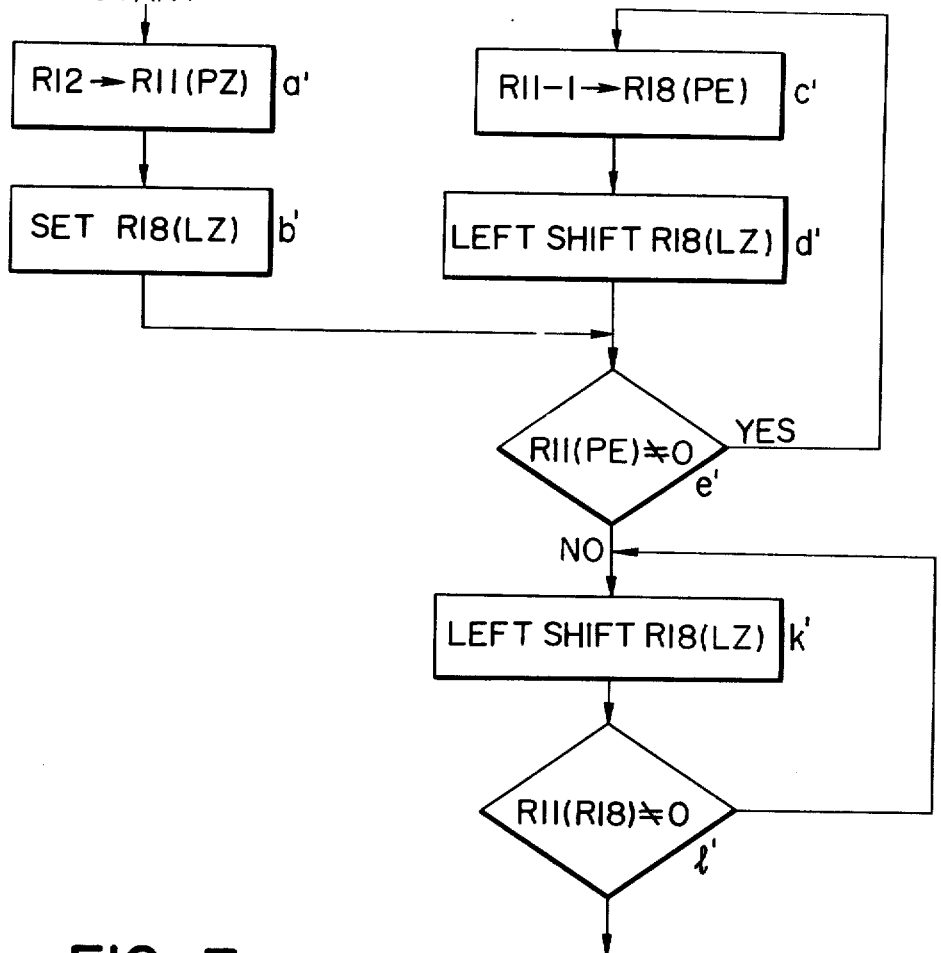
FIG. 6 is a flow chart for illustrating the suppression of undesired information contained in the information including a certain type of decimal point information.

In this latter case, the 0's occupying those digits less significant than the decimal point digit must not be suppressed, and the operation is executed in the manner as shown in the flow chart of FIG. 6.

During the steps (a') to (e'), as shown in FIG. 6, the register 18 is set to the digits more significant than the decimal point digit, whereafter during the steps (k') and (l') those of such more significant digits which correspond to undesired 0's are set by the register 18.

The register 11 employed in this embodiment is not restricted to the form shown, but may be replaced by a counter with some accessory circuits.

Figure 7:
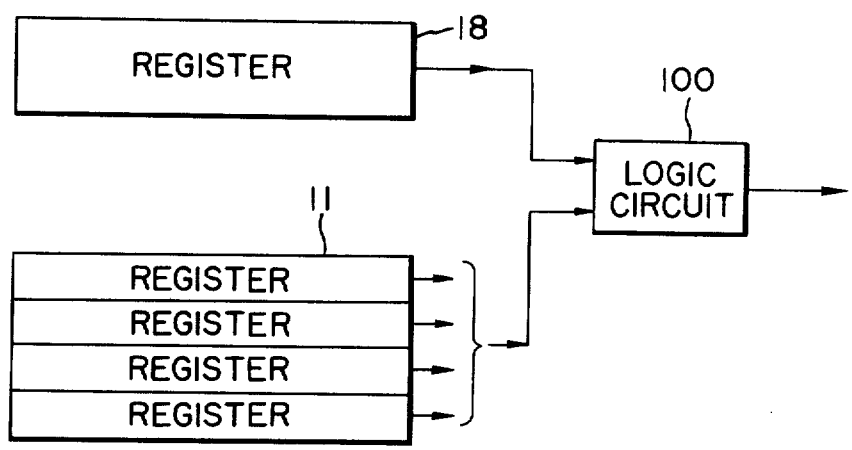
FIG. 7 illustrates another embodiment of the apparatus for suppressing undesired information.

FIG. 7 shows another embodiment of the suppression, in which, instead of inserting "F" code in the digits to be suppressed as described, the digits in the register 11 to be suppressed are detected by the register 18 and the outputs of the respective registers are introduced to a logic circuit 100, which produces as an output only the information of the register 11 corresponding to the period of 0 of the bit of the register 18. Any suitable logic circuit may be employed such as the AND GATE shown in FIG. 1A of U.S. Pat. No. 3,560,954, indicated by "AD." By applying such output of the logic circuit to the decoder 21 and printer 23 of FIG. 1 in the same manner as described in connection with FIG. 1, undesired information may be suppressed during the display or printing.

I claim:

1. An apparatus for suppressing undesired information comprising:
   a first register for storing therein plural digits of character or symbol information in the form of coded signals;
   a second register for storing therein a plurality of signals in digits corresponding to the digits of said first register;
   an output device for displaying information from said first register;
   determining means for associating certain digits of said first register with corresponding digits of said second register;
   means, responsive to said determining means, for detecting the presence of desired information in the corresponding digits in said first register;
   means, operative in response to detecting the presence of desired information in said corresponding digits of said first register, for reducing the number of said corresponding digits in said second register by one digit from the least significant digit thereof; and
   means, operative in response to failing to detect the presence of desired information in said corresponding digits of said first register, for providing said output device with all of the digits of information stored in said first register except any digit or digits therein associated with the signals then stored in the corresponding digit or digits of said second register, wherein only the desired digits of the information stored in said first register are displayed in the output device.

2. An apparatus for suppressing undesired information comprising;
   a first register for storing therein plural digits of character or symbol information in the form of coded signals;
   a second register for storing therein a plurality of signals in digits corresponding to the digits of said first register;
   determining means for associating certain digits of said first register with corresponding digits of said second register;
   means, responsive to said determining means, for detecting the presence of desired information in the corresponding digits in said first register;
   means, operative in response to detecting the presence of desired information in the corresponding digits of said first register, for reducing the number of said corresponding digits in said second register by one digit from the least significant digit thereof;
   means for generating specific code signals to be applied to the first register;
   means, operative in response to failing to detect the presence of desired information in said first register by said determining means, for storing said specific code signals in the digit or digits of said first register associated with the signals then stored in the corresponding digit or digits of said second register;
   a decoder for decoding all digits of the information stored in said first register except the digit or digits storing said specific code signals; and
   an output device driven by an output from said decoder to display the output therefrom.

3. An apparatus for suppressing undesired information comprising;
   a first register for storing therein plural digits of character or symbol information in the form of coded signals;
   a second register for storing therein a plurality of signals in digits corresponding to the digits of said first register;
   determining means for associating certain digits of said first register with corresponding digits of said second register;
   means, responsive to said determining means, for detecting the presence of desired information in the corresponding digits in said first register;
   means, operative in response to detecting the presence of desired information in the corresponding digits of said first register, for reducing the number of said corresponding digits in said second register by one digit from the least significant digit thereof;
   logic circuitry interconnected to the outputs of said first and second registers for producing an output of the digit or digits of information stored in said first register not associated with the contents of said second register;

means, operative in response to failing to detect the presence of desired information in the corresponding digits of said first register, for providing the logic circuitry with the information stored in said first register and the contents then stored in said second register; and means for applying the output from said logic circuitry to an output device.

* * * * *